J. R. JUNKIN.
STEERING DEVICE FOR AUTOMOBILES.
APPLICATION FILED JAN. 13, 1914.
1,109,422.
Patented Sept. 1, 1914.
2 SHEETS—SHEET 2.
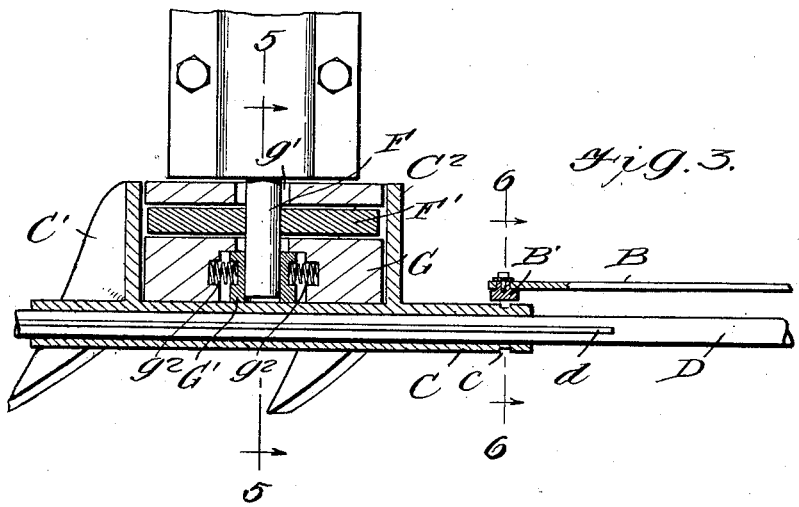
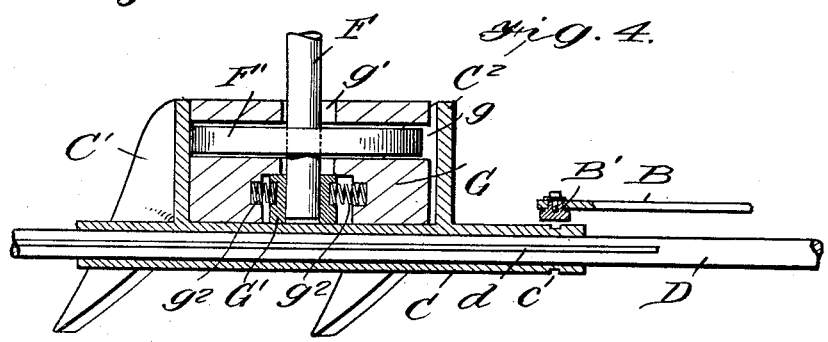
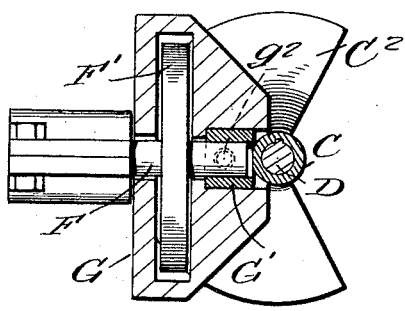
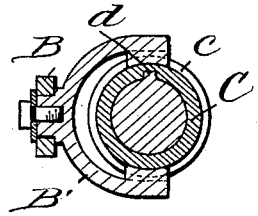
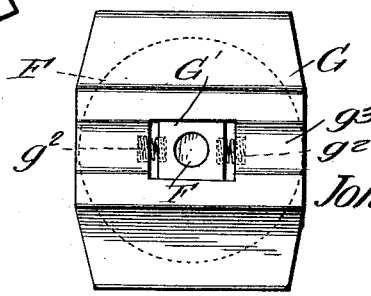
WITNESSES
F. C. Barry
Myron G. Clear
INVENTOR
John R. Junkin
BY Munn & Co.
ATTORNEYS

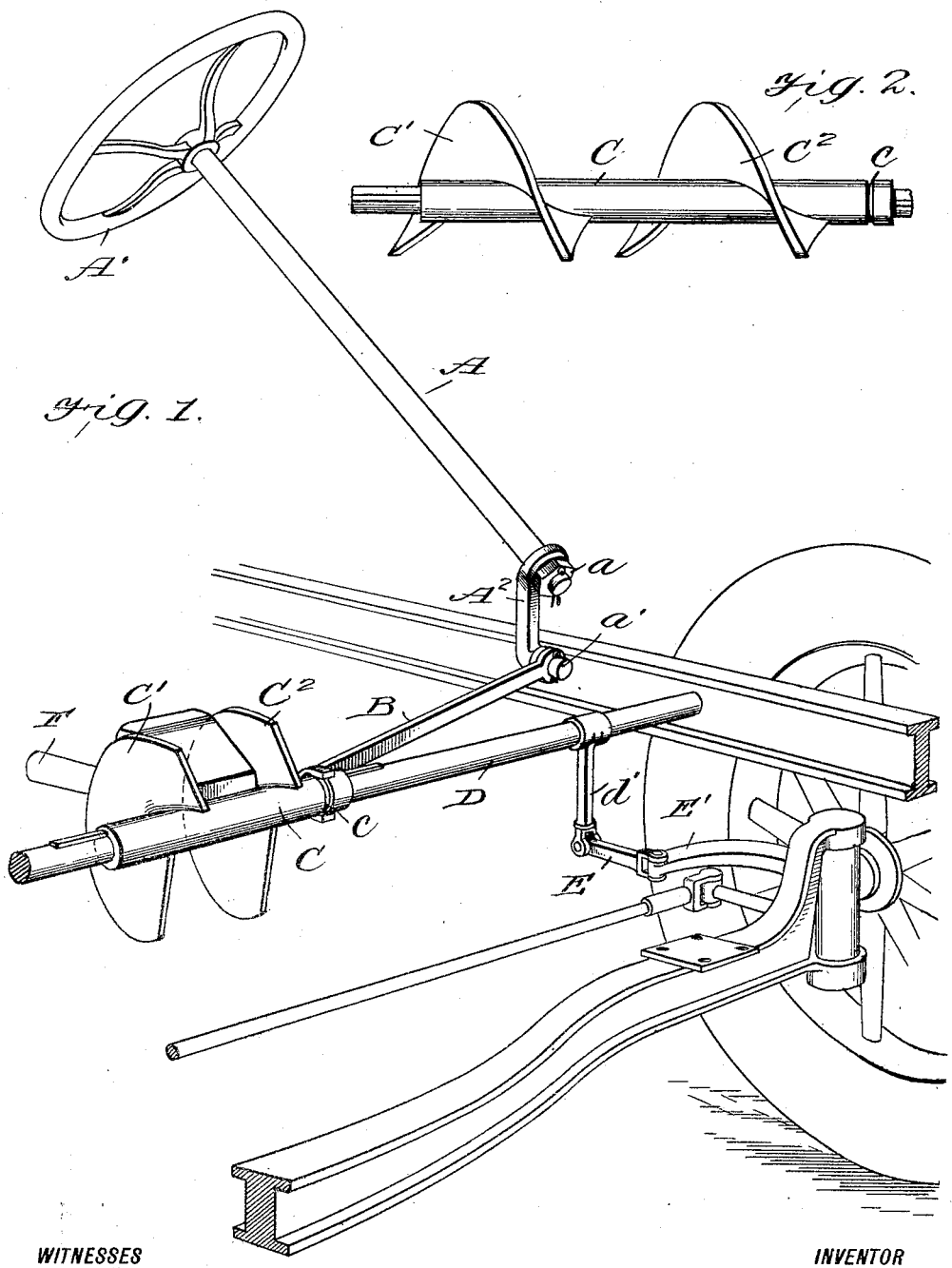

UNITED STATES PATENT OFFICE.

JOHN R. JUNKIN, OF FAIRBANKS, DISTRICT OF ALASKA.

STEERING DEVICE FOR AUTOMOBILES.

1,109,422. Specification of Letters Patent. Patented Sept. 1, 1914.

Application filed January 13, 1914. Serial No. 811,835.

*To all whom it may concern:*

Be it known that I, JOHN R. JUNKIN, a citizen of the United States, and a resident of Fairbanks, in the Territory of Alaska, United States of America, have made certain new and useful Improvements in Steering Devices for Automobiles, of which the following is a specification.

My present invention relates to an improvement in the steering devices of motor vehicles, and more particularly to that character of steering devices in which the actual turning of the wheels is accomplished through power derived from the motor, under control of the usual steering shaft or post, my invention being particularly adapted for use in connection with heavy machines either pleasure vehicles or commercial vehicles.

An object of my invention is to provide simple and effective means which may be perfectly controlled by the operator and which may be readily applied in connection with a vehicle in use.

With these and other objects in mind my invention resides in the features of construction, arrangement and operation to be now described in connection with the accompanying drawings, forming a part of this specification, and in which, Figure 1 is a perspective view illustrating the practical application of my invention to a motor vehicle, wherein parts of the latter of which are shown, Fig. 2 is a plan view of the splined sleeve and a portion of the shaft upon which it is mounted, Fig. 3 is a horizontal sectional view taken through the sleeve shown in Fig 2 and the power driven parts utilized in connection therewith, and showing these parts in an intermediate and inoperative position, Fig. 4 is a similar view illustrating the parts in engagement to turn the sleeve and its shaft in one direction, Fig. 5 is a vertical longitudinal section taken through the parts shown in Fig. 3 and substantially on line 5—5 of said figure, Fig. 6 is a similar view taken through the parts shown in Fig. 3 substantially on lines 6—6 of said figure, Fig. 7 is a bottom plan view of the bearing block to be hereinafter specifically referred to.

Referring now to these figures, and particularly to Fig. 1, A represents the steering post or shaft at the upper end of which is the usual steering wheel A', the lower end of this shaft, which is journaled in parts of the machine in any well known manner, being provided with a depending crank arm $A^2$, the upper end of which crank arm is secured to the steering post by a nut $a$, and the lower end of which crank arm is provided with a forwardly projecting pin $a'$ to which one end of a laterally projecting connecting rod B is coupled. The relative opposite end of this connecting rod B is pivotally united to a yoke B', as best shown in Fig. 6, the ends of the yoke arms being engaged within a circular groove $c$ adjacent one end of a sleeve C, it being noted that this sleeve is splined, by means of a key $b$, upon a transverse shaft D mounted below the lower forward end of the steering post A and the ends of which may be journaled in the side frame bars or other suitable portions of the frame of the vehicle in connection with which my improved steering arrangement is to be used. Adjacent one side of the machine, the shaft D is provided with a depending crank $d'$, the lower end of which may be pivotally united, by a connecting rod E, to the arm E' of one of the steering knuckles.

Power is applied to the shaft D through certain connections from a longitudinal shaft F which may be either the forward portion of the main shaft of the motor or a supplemental shaft with geared connections to the motor shaft. In any case the forward end of the shaft F is provided with a friction wheel F' positioned between spaced vanes V' and $C^2$ formed radially in the same degrees of curvature and extension partially around the sleeve C, the space between these vanes slightly exceeding the diameter of the said friction wheel. In this manner the friction wheel F' is constantly rotated, and when it is desired to rotate the wheels in either one direction or the other, the steering post A is correspondingly rotated to move the sleeve C longitudinally and bring one of the vanes C' and $C^2$ into engagement with the friction wheel F'. This results in causing rotative movement of the shaft D in view of the splined connection of sleeve C and such movement is communicated to one of the steering knuckles through the connections $d'$ E. and E' before described.

In order that the friction wheel may be normally held in an intermediate position out of contact with either of the vanes C' and $C^2$ I preferably provide a bearing block, as shown at G and best seen in Figs. 3, 4, 5 and 7, this block having a transverse slot $g$ through its sides and in which the friction wheel F′ is located and having a longitudinal opening through which shaft F is extended and at one end of which is an enlarged recess in which a supplemental block G′ is seated, this block receiving the forward extremity of the shaft F and having springs $g^2$ extended laterally between the sides of the same and the side walls of the enlarged recess of the main block G just mentioned. The forward end of the block G is grooved, as shown at $g^3$ in Fig. 7, so as to seat itself against the sleeve C between its vanes. Thus it will be seen that when the steering post is turned slightly and released, the sleeve C and shaft D will be partly turned so long as one of the vanes is in engagement with the friction wheel F′. The extent of this rotation will, however, be dependent upon the extent of the rotation of the steering post, just as in the ordinary steering mechanism, owing to the fact that the vanes C′ and C² are radially formed. In any position of the parts in which the friction wheel F′ is out of contact with both of the vanes, the spring controlled supplemental block G′ tends to prevent vibrations of the machine from displacing the neutral position of the parts and accidental contact of the friction wheel with either of the vanes.

I claim:—

1. In a motor vehicle steering device, the combination with the steering post and steering knuckles, of a transverse shaft journaled in portions of the frame of the machine and having a crank provided with connections uniting the same with one of the steering knuckles, a sleeve splined upon the said transverse shaft, a connecting rod having a yoke engaging a portion of the sleeve, a crank secured to the steering post and having connection with the said connecting rod, a pair of spaced vanes radially formed upon the said splined sleeve, a power driven shaft having a friction wheel extended between the said vanes of the sleeve, and a bearing block in which the end of the shaft and its friction wheel are mounted, said bearing block being disposed in the space between the vanes and having means to prevent accidental contact between the vanes and the friction wheel, all for the purpose described.

2. In a steering mechanism, the combination with a steering post and the steering knuckles, of a shaft journaled to rotate and having a crank controlling the steering knuckles, a sleeve splined upon the said shaft and provided with a pair of spaced vanes formed radially thereon and similarly curved, a power driven shaft having a friction wheel secured thereon and positioned in the space between the said vanes, and connections between the steering post and the splined sleeve whereby to control longitudinal movement of the sleeve by rotative movement of the post.

3. In a steering mechanism, the combination with a steering post and steering knuckles, of a shaft journaled to rotate and having connections for controlling the steering knuckles, a sleeve splined upon the shaft and having spaced vanes formed radially thereof and similarly curved, a power shaft having a friction wheel positioned in the space between the vanes, a bearing block seated between the vanes and through which the extremity of the said power driven shaft projects, a spring controlled block mounted in the said bearing block and which receives the extremity of the said driven shaft to prevent accidental contact of the friction wheel and vanes, and connections between the steering post and the sleeve for controlling longitudinal movement of the sleeve, all for the purpose described.

JOHN R. JUNKIN.

Witnesses:
MYRON G. CLEAR,
SOLON C. KEMON.